United States Patent [19]

Opper

[11] 4,352,052
[45] Sep. 28, 1982

[54] ADAPTOR FOR CHARGING SMALL CELLS IN LARGE-CELL CHARGER

[76] Inventor: Ray C. Opper, 3263 Vineyard Ave., Sp. 69, Pleasanton, Calif. 94566

[21] Appl. No.: 203,421

[22] Filed: Nov. 3, 1980

[51] Int. Cl.³ .................. H02J 7/00; H01M 10/46
[52] U.S. Cl. .................................. 320/2; 320/4; 429/100
[58] Field of Search .................... 320/2-5; 429/54, 99, 100

[56] References Cited

U.S. PATENT DOCUMENTS

| | | | |
|---|---|---|---|
| 2,036,547 | 4/1936 | Siemon | 171/314 |
| 2,418,141 | 4/1947 | Salazar | 320/2 |
| 2,431,116 | 11/1947 | Grover | 429/99 |
| 2,505,614 | 4/1950 | Gilbert et al. | 320/4 |
| 2,588,962 | 3/1952 | Carlson | 136/163 |
| 2,605,455 | 7/1952 | Swartz | 320/4 |
| 2,780,766 | 2/1957 | Hedding et al. | 320/4 |
| 3,045,059 | 7/1962 | Roth | 136/173 |
| 3,209,230 | 9/1965 | Mas | 320/2 |
| 3,579,075 | 5/1971 | Floyd | 320/2 |
| 3,684,583 | 8/1972 | Lehnen et al. | 429/54 |
| 3,696,283 | 10/1972 | Ackley | 320/2 |
| 3,969,148 | 7/1976 | Trattner | 429/100 |
| 3,990,919 | 11/1976 | Krueger | 429/100 |
| 4,009,429 | 2/1977 | Mullersman | 320/2 |
| 4,057,677 | 11/1977 | Mabuchi | 429/100 |
| 4,101,818 | 7/1978 | Kelly et al. | 320/2 |

FOREIGN PATENT DOCUMENTS 236821  7/1960  Australia ................................ 320/2

Primary Examiner—Robert J. Hickey
Attorney, Agent, or Firm—David Pressman

[57] ABSTRACT

An adaptor (26) for enabling small electrical cells (30) to be charged in a charger (10) designed to mate with and charge large cells. The adaptor has a recess for holding a small cell, is shaped and sized similar to the large cell, and has conductive parts (42, 44, 50, 54, and 52) designed to connect the contacts of the small cell to the terminals (22, 24) of the charger when the adpator is positioned in the charger. The adaptor is cylindrical, has an insulating body portion (36) and conductive, removable top and bottom caps (44 and 42). A hole or channel (48) through the body portion contains a spring (50) and a space to receive the small cell.

11 Claims, 2 Drawing Figures

ADAPTOR FOR CHARGING SMALL CELLS IN LARGE-CELL CHARGER

BACKGROUND

1. Field of Invention

This invention relates to the charging of electrical cells, particularly to a device for enabling relatively small electrical cells to be charged in a charger designed for charging relatively large cells.

2. Description of Prior Art

Although devices are available for charging and recharging primary and secondary electrical cells, or batteries of such cells, such devices are capable of charging only relatively large cells, mainly cylindrical 1.5-volt cells of the "AA", "C", and "D" sizes, and 9-volt rectangular batteries with snap-on contacts. Such chargers work satisfactorily and are able to prolong the lives of such cells and batteries. However smaller-size cells, such as those used in hearing aids and other miniature equipment, were not able to be used in such chargers with convenience or ease. This is because such relatively small-size cells (hereafter minicells), although of the same voltage as the larger AA, C, and D cells, are not of the size to fit properly into the charger; also the terminals of the minicells are too closely spaced to mate with the appropriate terminals of the charger. Thus users of such minicells had to repurchase a new cell each time a previous cell became discharged. As is well known by users of hearing aids, it is possible to discharge its relatively small, yet comparatively expensive cell in a very short period. For example one common hearing aid cell, type 76 (full designation S76E-6) now costs about $11 to $20 for a six-unit package, yet will last only about four days if used continuously!

Accordingly one object of the present invention is to provide a way for relatively small electrical cells to be conveniently and easily recharged. Another object is to enable standard electrical cell chargers to be more versatile and useful. Yet another object is to lower the cost of cell usage for hearing aid wearers by enabling them to utilize the same cell for many times its normal life by recharging it at minimal cost, rather then repurchasing a new cell each time a previous cell became discharged. Further objects and advantages of the invention will become apparent from a consideration of the ensuing description and drawings thereof.

DRAWINGS

Figure 1:
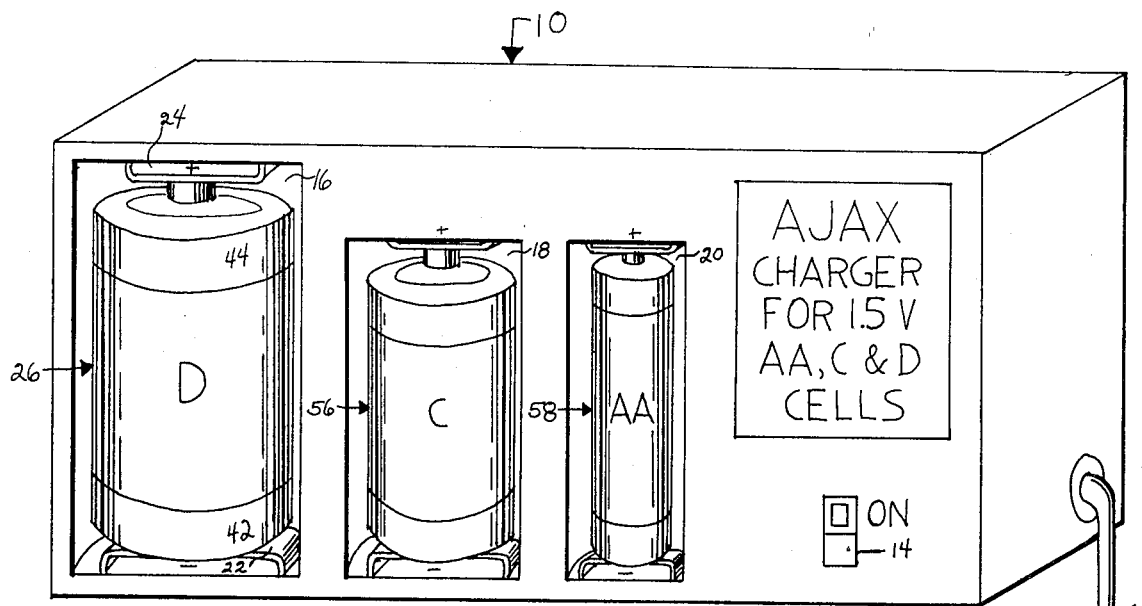
FIG. 1 shows an isometric view of a charger with minicells (not shown) being charged in respective adaptors according to the invention.

REFERENCE NUMERALS 10 home charger
16 D-cell compartment
22 negative contact
30 minicell
36 body portion of 26
12 cord and plug
18 C-cell compartment
24 positive contact
32 upper contact of 30
38 upper neck portion of 26
14 off-on switch
20 AA-cell compartment
26 D-size adaptor
34 nub contact of 30
40 lower neck portion of 26
42 bottom cap of 26
50 helical spring
56 C-size adaptor
44 top cap of 26
46 top nub
52 metal disc on 50
58 AA-size adaptor
48 lumen of 36
54 metal cap on 50

FIG. 1—CHARGER

In FIG. 1 a standard home charger for recharging AA, C, and D-size 1.5-volt cells is shown at 10. The charger has an electrical cord and plug 12 for connection to a regular 120-volt AC outlet (not shown), an off-on switch 14, and three compartments 16, 18, and 20 for receiving, holding and making electrical contacts to D, C, and AA cells, respectively. For example, the largest compartment 16 is sized to receive a relatively large (D) cell and has positive and negative electrical contacts 24 and 22, respectively. Thus when a D cell (which has an appearance similar to that of an adaptor 26) is positioned in compartment 16, it will be recharged when the charger 10 is plugged in and switch 14 is turned on.

It will be apparent that charger 10 and other home and standard chargers are able easily to recharge relatively large cells with relatively widely-spaced terminals, such as AA, C, and D size cells. However it was not readily feasible to use such chargers to recharge minicells because the compartments of charger 10 and other chargers were too large and the terminals in such chargers were too far apart to mate with such minicells.

FIG. 2—ADAPTOR

Figure 2:
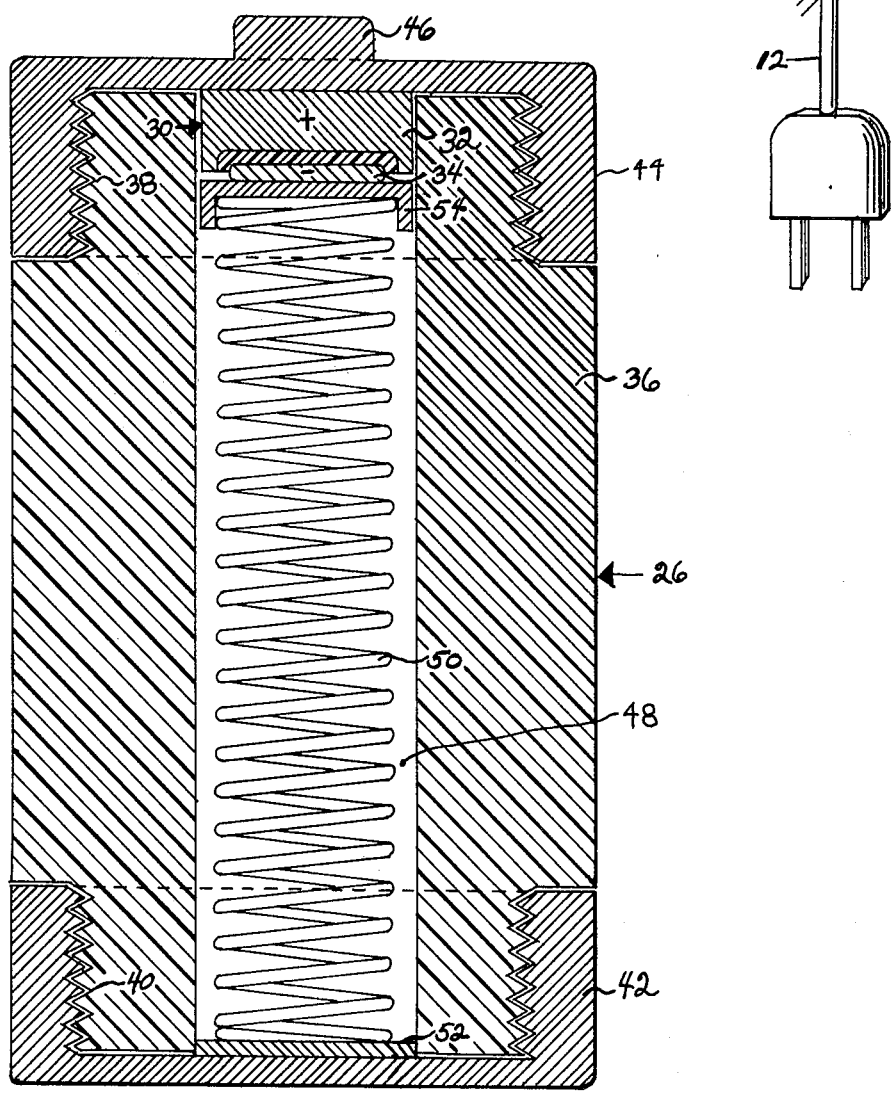
FIG. 2 shows a section of an adaptor according to the invention holding a minicell for charging.

In FIG. 2 a typical minicell is shown in section at 30, inside of an adaptor 26 according to the invention. Cell 30 is a cylindrical, type 76 hearing aid cell which measures about 1.1 cm in diameter by about 0.56 cm thick. Its upper contact 32 is positive and its lower, nub-type contact 34 is negative (contrary to conventional practice where the nub contact is positive and the large contact is negative).

Adaptor 26, also shown in section, holds and facilitates the recharging of minicell 30 in charger 10 of FIG. 1. Adaptor 26 consists of an insulating body portion 36 of plastic (thermoset or thermoplastic, e.g., nylon) having narrowed and threaded upper and lower neck portions 38 and 40. A metal bottom cap 42 having a flat-bottomed surface is threaded onto and telescopes over lower head portion 40 and a metallic top cap 44 having a top nub 46 is threaded onto and telescopes over upper head portion 38. Body portion 36 has a through hole or lumen 48, the ends of which are closed by the top and bottom caps 44 and 42, respectively. Positioned in lumen 48 is a helical spring 50, the bottom end of which is welded to a metal disc 52 and the top end of which is welded to a metal cap 54.

The top and bottom caps may be of aluminum. The size of the entire adaptor is preferably the same size as a standard D battery (6.1 cm × 3.4 cm in diameter), so that the outside appearance of the adaptor is as indicated at 26 in FIG. 1.

In use, in order to recharge cell 30 adaptor 26 is disassembled and cell 30 is placed in the top of lumen 48 between spring cap 54 and top cap 44, as indicated in FIG. 2. Adaptor 26 then is assembled and plugged into cavity 16 in charger 10 and charger 10 is turned on. Electrons will thereupon flow from bottom (negative) terminal 22, bottom cap 42, spring plate 52, spring 50, and top spring cap 54 to the negative contact 34 of battery 30 and thence via the positive contact 32 of the battery and upper cap 44 of the adaptor to top (positive) terminal 24 of charger 10. When adaptor 26 containing cell 30 has been in position in charger 10 long enough to recharge cell 30, the adaptor can be disassembled, cell 30 retrieved, whereby cell 30 can again be reused in the hearing aid or other electronic device. I have found that a typical discharged type 76 cell can be recharged overnight in a typical home charger; the recharging time for a minicell being shorter than that required for a larger cell.

Cell 30 is most easily placed in the position shown in adaptor 26 by first partially unscrewing bottom cap 42 of adaptor 26 in order to drop down spring 50 and its top cap 54 to form a recess in lumen 48 adjacent the upper rim surface of body portion 36 of adaptor 26. Thereupon cell 30 need merely be dropped into the recess with its negative terminal 34 facing downward, whereafter top cap 44 is screwed home onto body portion 36. Then bottom cap 42 is rescrewed home and the assembly will appear as indicated in FIGS. 1 and 2.

Top and bottom caps 42 and 44 may each be about 1.1 cm in height, excluding nub 46 of top cap 44. Spring 50 should be long enough so that when completely relaxed it has a length slightly less than the height of body portion 36. The diameter of lumen 48 should be about 1.2 cm, i.e., slightly larger than the diameter of the type 76 hearing aid cell.

It will be appreciated that it is extremely simple and easy to recharge minicells in the adaptor. Thus senior citizens, who are the principal users of hearing aid cells, can recharge such cells quite readily and without difficulty. I have found that use of the adaptor on a consistent basis will effect a great reduction in the cost of hearing aid operation. This is because of the large cost of hearing aid cells ($11 to $20 as aforediscussed), and the extremely low cost of recharging (about 1¢ or less per cell at typical present electrical energy rates).

RAMIFICATIONS

While the above description contains many specificities, these should not be construed as limitations upon the scope of the invention, but rather as an exemplification of one preferred embodiment thereof. Many other embodiments can be visualized by those skilled in the art.

For example, in lieu of charging a type 76 cell, the adaptor can also be used to recharge even smaller cells, such as type 13 hearing aid cells; these measure about 0.48 cm thick by about 0.79 cm in diameter. Although these are about 25% smaller in diameter than the type 76 cell, they will work in an adaptor having the same diameter lumen 48 as that suitable for a type 76 cell. Also a type N cell, which has a shape similar to that of an AA cell, but which is smaller, measuring about 3 cm in height by 1.2 cm in diameter, may be positioned in adaptor 26 for recharging. However in this case it is preferred that spring 50 be made about 30% shorter due to the extra length of the type N cell. For recharging hearing aid cells of the types mentioned, it is preferred to make adaptor 26 the same size as a standard D cell. For recharging even smaller cells, such as those used in watches, the adaptor can also be made in a smaller size according to that of any standard cell of the same voltage of the minicell to be held and recharged, such as a C cell, indicated at 56 in FIG. 1 (2.6 cm diameter by 4.9 cm), or an AA cell, as indicated at 58 in FIG. 1 (1.4 cm diameter by 5.0 cm).

Although the top contact of spring 50 is shown as a cap and the bottom contact is shown as a disc, these portions may be interchanged, or the same type contact may be used on both the top and bottom ends of the spring. If cup-type contacts such as 54 are used, welding to spring 50 can be omitted. Alternatively, the spring contacts may be omitted entirely, especially when the cell is positioned in the bottom of the adaptor where its large surface will contact spring 50.

In lieu of metal top and bottom adaptor caps 42 and 44 as indicated, only the central or greater portion of the caps (including nub 46) may be metal, such that a sufficiently large conductive surface will be provided to make contact with terminals 22 and 24 in adaptor 10. Also while bottom and top caps 42 and 44 are preferably threadedly mated with body 36 of the adaptor, they can also be mated by snap-on, friction, or bayonet types of engagement. Further, while the adaptor is shown with removable top and bottom caps, either cap can be fixedly attached to the body, or vice-versa, or omitted by being made integral with the body. Also both caps can be made integral or fixedly attached to the adaptor's body, in which case the cell could be inserted via a side hole, if a side lever is provided to move the spring aside.

Although home charger 10 is shown as having three compartments for charging C, D, and AA cells, respectively, it will be understood that the invention is usable with other types of chargers (home and commercial/industrial) which are available in many other sizes and shapes. For example one common home charger, designated Radio Shack type 23-120, has four compartments with negative contact 22 being spring-loaded and movable so as to mate with AA, C or D-size cells. Also in this charger, the cells must be charged in pairs, the charger has the capability of recharging 9-volt batteries, it has no off-on switch, and in lieu of a 120-volt cord and plug 12, it utilizes a plug in transformer and a low-voltage cord. This charger also has a lid to protect the user in case a cell explodes during charging and to prevent personnel from touching contacts 22 and 24, although such contacts have non-lethal potentials applied thereto. Other home chargers are available with various other features.

The adaptor can in fact be used with any type of charger, so long as it will mate electrically and mechanically with the charger in the same manner as the cells or batteries for which the charger is designed, and so long as it can hold smaller cells or batteries which are too small properly to fit into the charger. While the adaptor preferably has the same size and shape as the larger cell which is designed to mate with the charger, it is possible to make the adaptor in other shapes and still mate with the charger mechanically and electrically. E.g., the adaptor could have a triangular, rectangular, oval, etc. cross section.

Lastly, the term "charging", or "recharging", as used herein includes the application of a reverse current to a primary cell for the purpose of depolarization (removal of liberated hydrogen from the cell's negative electrode) to restore the cell's current-supply potential, as well as the recharging of a secondary cell, e.g., of the NiCd type.

Accordingly it is intended that the true scope of the invention be determined according to the following claims and their legal equivalents.

I claim:

1. For use with a charger having a pair of relatively widely-spaced terminals for mating with and charging an energy storage cell having a pair of correspondingly widely-spaced contacts, an adaptor for enabling an energy storage cell having a pair of relatively closely-spaced contacts to be charged in said charger, said adaptor comprising:

means for (a) holding said energy storage cell having said closely-spaced contacts, (b) causing said relatively-closely spaced contacts of said cell, when said cell is held in said adaptor, to be connected electrically with said respective pair of terminals of said charger, and (c) enabling said adaptor to mate physically with said pair of terminals of said charger, said adaptor having a substantially cylindrical shape, said adaptor comprising a body portion and removable mating top and bottom portions, said body portion having an axial through hole extending through said body portion from the top to the bottom thereof, a spring positioned in said axial through hole and, when relaxed, occupying substantially the entire length of said through hole in said body portion, said removable top and body portions each comprising a cap which covers a respective end of said through hole so as to captivate said spring, said caps each providing an electrically conductive path from said spring, when said spring is in contact with an interior side of said cap, to an exterior portion of said cap, each cap mating with said body portion in telescoping relationship and being partially extensible from said body portion in an axial direction without freeing said spring, whereby energy storage cells of a wide range of lengths, and hence contact spacings, can be held in said adaptor, and a cell of very short length easily can be positioned in the top of said through hole of said adaptor by partially withdrawing the bottom cap from said adaptor to allow said spring to drop down to provide a recess at the top of said through hole, placing said short cell in said recess, fully assembling said top cap to said adaptor, and then fully assembling said bottom cap onto said adaptor to compress said spring.

2. The adaptor of claim 1 wherein said body portion is made of insulating material and said top and bottom body portions are made, at least in part, of conductive material.

3. The adaptor of claim 2 wherein said body, top, and bottom portions are each threaded for screw-on mating.

4. The adaptor of claim 2 wherein said body, top, and bottom portions are matable by friction fit.

5. The adaptor of claim 2 wherein said body, top, and bottom portions are matable by snap-on fit.

6. The adaptor of claim 1 wherein one end of said spring has a conductive cap positioned thereover.

7. For use with a charger having a pair relatively widely-spaced terminals for mating with and charging an energy storage cell having a pair of correspondingly widely-spaced contacts, an adaptor for enabling a very short energy storage cell having a pair of relatively closely-spaced contacts to be charged in said charger, said adaptor comprising:

a body portion and top and bottom end caps, said bottom end cap having a conductive, substantially flat bottom, said top end cap having a conductive nub extending therefrom, said bottom cap and said nub or said top cap being electrically insulated from each other, said body portion having an elongated axial through hole therein perpendicular to said flat bottom end, said through hole containing a helical spring which, when relaxed, occupies substantially the entire length of said through hole, the opposite ends of said through hole being in communication with said top and bottom caps, said bottom and top caps being separable from said body portion and engagable therewith in an overlapping telescoping configuration such that said top cap can be completely removed from said body portion, said bottom cap can be at least partially removed from said body portion to allow said spring to drop down to occupy less than the entire length of said through hole and thereby provide a space at the top of said through hole for insertion of said energy storage cell, whereby said top cap can be fully assembled to said body portion to hold said energy storage cell and said bottom cap can thereafter be fully assembled to compress said spring against said energy storage cell and thereby provide good electrical contacts with said energy storage cell.

8. The adaptor of claim 7 wherein said body and caps are threaded for screw-on mating.

9. The adaptor of claim 7 wherein said body and caps are matable by friction fit.

10. The adaptor of claim 7 wherein said body and caps are matable by snap-on fit.

11. The adaptor of claim 7 wherein one end of said spring has a conductive cap positioned thereover.

* * * * *